US012794051B2

(12) United States Patent
Jiang

(10) Patent No.: US 12,794,051 B2
(45) Date of Patent: Nov. 10, 2026

(54) ELECTROCHEMICAL APPARATUS AND ELECTRONIC APPARATUS

(71) Applicant: Ningde Amperex Technology Limited, Ningde City (CN)

(72) Inventor: Jing Jiang, Dongguan City (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 910 days.

(21) Appl. No.: 17/951,159

(22) Filed: Sep. 23, 2022

(65) Prior Publication Data

US 2023/0013955 A1 Jan. 19, 2023

Related U.S. Application Data

(63) Continuation of application No. PCT/CN2020/080968, filed on Mar. 24, 2020.

(51) Int. Cl.
*H01M 50/186* (2021.01)
*H01G 11/74* (2013.01)
(Continued)

(52) U.S. Cl.
CPC .......... *H01M 50/186* (2021.01); *H01G 11/74* (2013.01); *H01G 11/80* (2013.01);
(Continued)

(58) Field of Classification Search
CPC ............. H01M 50/186; H01M 50/105; H01M 50/178; H01M 50/531; H01M 50/548;
(Continued)

(56) References Cited

U.S. PATENT DOCUMENTS

| | | | |
|---|---|---|---|
| 2014/0356692 A1 | 12/2014 | Park et al. | |
| 2018/0277902 A1 | 9/2018 | Jin et al. | |
| 2019/0319251 A1 | 10/2019 | Xiao | |

FOREIGN PATENT DOCUMENTS

| | | |
|---|---|---|
| CN | 104662697 A | 5/2015 |
| CN | 204614821 U | 9/2015 |

(Continued)

OTHER PUBLICATIONS

Machine translation of KR 20170013809A, (Year: 2025).*

(Continued)

*Primary Examiner* — Christian Roldan
*Assistant Examiner* — Albert Michael Hilton
(74) *Attorney, Agent, or Firm* — WHDA, LLP

(57) ABSTRACT

An electrochemical apparatus includes an electrode assembly, a packaging film, and a first tab, where the first tab is electrically connected to the electrode assembly, the packaging film includes a first packaging film and a second packaging film which are located at two sides of the first tab, the first packaging film includes a first sealing zone, the second packaging film includes a second sealing zone, and the first sealing zone and the second sealing zone are bonded to seal the electrode assembly. The first sealing zone includes a first region and a second region, the first region covers a projection of the first tab on the first sealing zone, the second region connects to the first region, and a width of the second region is less than that of the first region.

16 Claims, 15 Drawing Sheets

(51) Int. Cl.
*H01G 11/80* (2013.01)
*H01M 50/105* (2021.01)
*H01M 50/178* (2021.01)
*H01M 50/531* (2021.01)
*H01M 50/548* (2021.01)
*H01M 50/55* (2021.01)

(52) U.S. Cl.
CPC ....... *H01M 50/105* (2021.01); *H01M 50/178* (2021.01); *H01M 50/531* (2021.01); *H01M 50/548* (2021.01); *H01M 50/55* (2021.01); *H01M 2220/30* (2013.01)

(58) Field of Classification Search
CPC .. H01M 50/55; H01M 2220/30; H01G 11/74; H01G 11/80
See application file for complete search history.

(56) References Cited

FOREIGN PATENT DOCUMENTS

| | | | | | |
|---|---|---|---|---|---|
| CN | 106252578 | A | | 12/2016 | |
| CN | 107134593 | A | | 9/2017 | |
| CN | 207183424 | U | | 4/2018 | |
| CN | 207852828 | U | | 9/2018 | |
| CN | 108886126 | A | | 11/2018 | |
| CN | 209496945 | U | | 10/2019 | |
| EP | 3242347 | A1 | | 11/2017 | |
| JP | 2012-209124 | A | | 10/2012 | |
| JP | 2019087336 | A | * | 6/2019 | |
| JP | 2020053121 | A | * | 4/2020 | |
| KR | 20120016905 | A | | 2/2012 | |
| KR | 20120063236 | A | * | 6/2012 | .......... H01M 50/183 |
| KR | 20170013809 | A | * | 2/2017 | .......... H01M 50/124 |

OTHER PUBLICATIONS

Machine translation of JP-2019087336-A (Year: 2025).*
Machine translation of KR-20120063236-A (Year: 2025).*
Machine translation of JP-2020053121-A (Year: 2026).*
International Search Report dated Dec. 25, 2020, issued in counterpart Application No. PCT/CN2020/080968, with English Translation. (6 pages).
Extended (Supplementary) Search Report dated Sep. 21, 2023, issued in counterpart EP Application No. 20927304.4. (8 pages).

* cited by examiner

ELECTROCHEMICAL APPARATUS AND ELECTRONIC APPARATUS

CROSS-REFERENCE TO RELATED APPLICATIONS

The present application is a continuation application of PCT application No. PCT/CN2020/080968, filed on Mar. 24, 2020, the disclosure of which is hereby incorporated by reference in its entirety.

TECHNICAL FIELD

This application relates to the field of energy storage technologies, and in particular, to an electrochemical apparatus and an electronic apparatus containing such electrochemical apparatus.

BACKGROUND

Electrochemical apparatuses (for example, pouch cells) are sealed by packaging bags (for example, aluminum-plastic films or steel-plastic films). To seal a packaging bag, adhesive on a packaging position is extruded to two sides so that superfluous adhesive flows out of the seal region (which is called adhesive overflow). As a result, the packaging film has relatively big adhesive lumps at the adhesive overflow locations and thus protrusions are produced. Therefore, the adhesive overflow locations will become stress concentration points, making the packaging film apt to have fatigue cracks when the electrochemical apparatus falls or vibrates, thereby impacting safety performance and service life of the electrochemical apparatus. Overflow adhesive at the packaging positions of tabs of the electrochemical apparatus has even greater impact on the safety performance and service life thereof.

SUMMARY

In view of the deficiencies of the prior art, it is necessary to propose an electrochemical apparatus which can solve the problem of adhesive overflow.

It is also necessary to provide an electronic apparatus including such electrochemical apparatus.

This application provides an electrochemical apparatus including an electrode assembly, a packaging film, and a first tab, where the first tab is electrically connected to the electrode assembly, the packaging film includes a first packaging film and a second packaging film which are located at two sides of the first tab, the first packaging film includes a first sealing zone, the second packaging film includes a second sealing zone, and the first sealing zone and the second sealing zone are bonded to seal the electrode assembly. The first sealing zone includes a first region and a second region, the first region covers a projection of the first tab on the first sealing zone, the second region connects to the first region, and a width of the second region is less than that of the first region.

In the electrochemical apparatus according to this application, the width of the second region of the first sealing zone is set to be less than that of the first region of the first sealing zone, thus retaining the sealing width at the first tab while reducing the sealing width at one side of the first tab. In this way, the sealing strength at the first tab remains unchanged while a position of the second region where a width difference is formed with respect to the first region can be a space for accommodating the overflow adhesive, thereby alleviating the problem of adhesive overflow and reducing stress concentration points. Therefore, safety performance and service life of the electrochemical apparatus can be improved.

In some embodiments of this application, the width of the second region is 40%-95% of that of the first region.

When the width ratio of the second region to the first region is less than 40%, the width $W_2$ of the second region is excessively small, which impacts the packaging strength, thereby impacting life of the package. On the contrary, when the width ratio of the second region to the first region is greater than 95%, enough space is not available for accommodating the overflow adhesive, so that adhesive overflow is not desirably alleviated.

In some embodiments of this application, the first packaging film further includes a first non-sealing zone, the first non-sealing zone includes a first connecting portion and a second connecting portion, where the first connecting portion connects the first sealing zone and the second connecting portion, in a thickness direction of the packaging film, an angle between the first connecting portion and the first sealing zone is greater than 0° and less than or equal to 90°.

In this way, an overflow adhesive groove is formed between the first non-sealing zone and the second packaging film, where the overflow adhesive groove provides enough space for accommodating the overflow adhesive so that the overflow adhesive exhibits a morphology protruding towards the first sealing zone, thereby preventing the packaging film from having stress concentration points at adhesive overflow locations.

In some embodiments of this application, the second packaging film further includes a second non-sealing zone, the second non-sealing zone includes a third connecting portion and a fourth connecting portion, where the third connecting portion connects the second sealing zone and the fourth connecting portion, in the thickness direction of the packaging film, an angle between the third connecting portion and the second sealing zone is greater than 0° and less than or equal to 90°.

In this way, the overflow adhesive groove can have a greater space to accommodate more overflow adhesive.

In some embodiments of this application, the second region and the second sealing zone together form a thickness $T_2$ (mm) and a distance between the second connecting portion and the fourth connecting portion is D (mm), where $T_2 < D \leq 10T_2$. This range helps to guarantee the packaging strength and sealing effect.

The distance D being greater than $10T_2$ means an excessive amount of overflow adhesive, an over-sealed sealing zone, and over-fused polymer film in the packaging film. On the contrary, the distance D being less than or equal to $T_2$ means that the overflow adhesive at the sealing zone is not completely fused, in which case, the sealing is not firm.

In some embodiments of this application, the first region and the second sealing zone form a thickness $T_1$ (mm), where $T_1 < T_1 \leq 4T_2$.

Therefore, the packaging strength at the first region is consistent with that at the second region, guaranteeing an overall packaging effect and avoiding local packaging weaknesses.

In some embodiments of this application, a packaging tension between the first sealing zone and the second sealing zone is 1 N/mm-10 N/mm.

The packaging tension being less than 1 N/mm means inadequate packaging strength, and the packaging tension being within 10 N/mm means a tension limit of the packaging film is not exceeded.

In some embodiments of this application, the first sealing zone further comprises a third region, the third region connects to the first region, and a width of the third region is less than the width of the first region.

In some embodiments of this application, the width of the third region is 40%-95% of the width of the first region.

In some embodiments of this application, the electrochemical apparatus further includes a second tab, where the second tab is electrically connected to the electrode assembly, the second tab is located on the same side of the electrode assembly as the first tab. The first sealing zone further includes a fourth region, where the fourth region covers a projection of the second tab on the first sealing zone, the second region connects to the fourth region, and a width of the third region is less than a width of the fourth region.

In some embodiments of this application, the second tab is located on a different side of the electrode assembly than the first tab. The first packaging film further includes a third sealing zone, where the third sealing zone includes a fifth region and a sixth region, the fifth region covers a projection of the second tab on the third sealing zone, the fifth region connects to the sixth region, and a width of the sixth region is less than that of the fifth region.

This application further provides an electronic apparatus including the above electrochemical apparatus.

| Reference signs of main components: | |
|---|---|
| Electrode assembly | 10 |
| First tab | 11 |
| Second tab | 12 |
| Tab sealant | 13 |
| Packaging film | 20 |
| First packaging film | 20a |
| Second packaging film | 20b |
| First sealing zone | 21 |
| Second sealing zone | 22 |
| First non-sealing zone | 23 |
| Second non-sealing zone | 24 |
| Overflow adhesive groove | 25 |
| Third sealing zone | 26 |
| Electrochemical apparatus | 100 |
| Packaging seal head | 200 |
| First seal head | 201 |
| Second seal head | 202 |
| First region | 211, 211' |
| Second region | 212, 212' |
| Third region | 213, 213' |
| Fourth region | 214 |
| First connecting portion | 231 |
| Second connecting portion | 232 |
| Third connecting portion | 241 |
| Fourth connecting portion | 242 |
| Fifth region | 261 |
| Sixth region | 262 |
| Seventh region | 263 |
| Electronic apparatus | 300 |
| First end face | 2010 |
| First end face area | 2011 |
| Second end face area | 2012 |
| Third end face area | 2013 |
| Fourth end face area | 2014 |
| Chamfered face | 2015 |
| Second end face | 2020 |
| Width | $W_1$, $W_1'$, $W_2$, $W_2'$, W3, W3', $W_4$, $W_5$, $W_6$, $W_7$ |
| Thickness | $T_1$, $T_2$, $T_3$ |
| Distance | D |

This application will be further described with reference to the accompanying drawings in the following specific embodiments.

DESCRIPTION OF EMBODIMENTS

The following clearly and completely describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the examples of this application without creative efforts shall fall within the protection scope of this application.

Unless otherwise defined, all technical and scientific terms used herein shall have the same meanings as commonly understood by those skilled in the art to which this application belongs. The terms used herein in the specification of this application are merely intended to describe specific embodiments but not intended to limit this application.

The following describes in detail some embodiments of this application with reference to the accompanying drawings. In absence of conflicts, the following embodiments and features in the embodiments may be combined.

Figure 1:
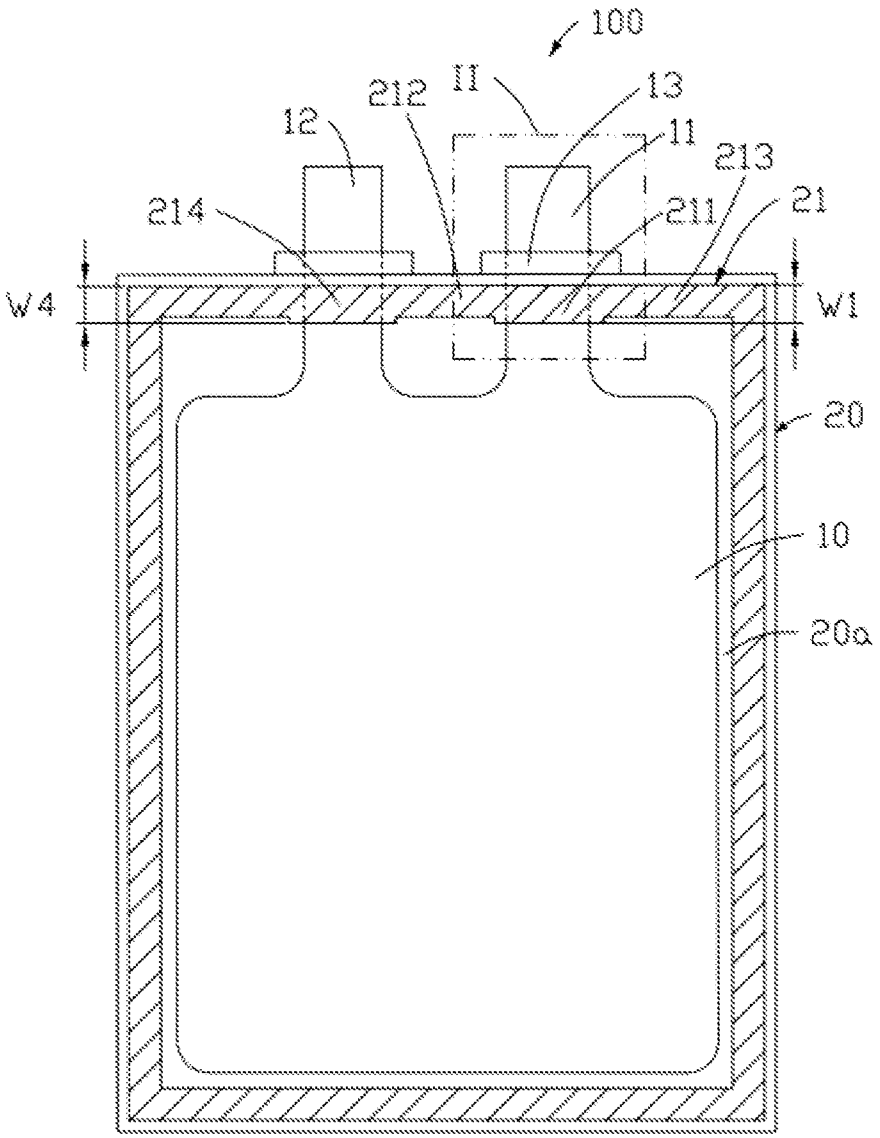
FIG. 1 is a schematic diagram of a cross section of an electrochemical device according to an embodiment of this application.

Referring to FIG. 1, an embodiment of this application provides an electrochemical apparatus 100 including an electrode assembly 10, a packaging film 20, and a first tab 11, where the first tab 11 is electrically connected to the electrode assembly 10. The packaging film 20 includes a first packaging film 20*a* and a second packaging film 20*b* (shown in FIG. 7A) which are located at two sides of the first tab 11. The first packaging film 20*a* includes a first sealing zone 21 and the second packaging film 20*b* includes a second sealing zone 22, where the first sealing zone 21 and the second sealing zone 22 are bonded to seal the electrode assembly 10.

The first sealing zone 21 includes a first region 211 and a second region 212, where the first region 211 covers a projection of the first tab 11 on the first sealing zone 21 and the second region 212 connects to the first region 211. Also referring to FIG. 2, a width $W_2$ of the second region 212 is less than a width $W_1$ of the first region 211. The width $W_1$ is defined as a size of the first region 211 in an extension direction of the first sealing zone 21 and the width $W_2$ is defined as a size of the second region 212 in the extension direction of the first sealing zone 21.

The electrochemical apparatus 100 in this application includes all apparatuses capable of electrochemical reactions. Specifically, the electrochemical apparatus 100 includes all kinds of primary batteries, secondary batteries, fuel batteries, solar batteries, and capacitors (for example, super capacitors). Optionally, the electrochemical apparatus 100 may be a secondary lithium battery, including a secondary lithium metal battery, a secondary lithium-ion battery, a secondary lithium polymer battery, or a secondary lithium-ion polymer battery.

The bonding of the first sealing zone 21 and the second sealing zone 22 may be a press fit of the first packaging film 20*a* and the second packaging film 20*b* via a packaging seal head, so that polypropylene layers in the part of first packaging film 20*a* and the part of second packaging film 20*b* (that is, the first sealing zone 21 and the second sealing zone 22) located at a press fit position undergo a thermal fusion so as to bond the first sealing zone 21 and the second sealing zone 22 for sealing. Optionally, the manner of bonding the first sealing zone 21 and the second zone 22 for sealing is not limited thereto, but may be thermal fusion of other materials or other forms of fusion.

The second region 212 may be located on any side of the first region 211 and this application is not limited in this sense. As shown in FIG. 1, the second region 212 is located on the left side of the first region 211. However, in other embodiments, the second region 212 may further be located on the right side of the first region 211.

The position where the first tab 11 is located is often a packaging weakness point, and excessive overflow adhesive may cause fatigue cracks in the packaging film 20 at the sealing position under abuse of external force, bringing about electrolyte leakage. According to this application, the width of the second region 212 is set to be less than that of the first region 211, thus retaining the sealing width at the first tab 11 while reducing the sealing width at one side of the first tab 11. In this way, the sealing strength at the first tab 11 remains unchanged while a position where the second region 212 has a width difference with respect to the first region 211 can be a space for accommodating the overflow adhesive, thereby alleviating the problem of adhesive overflow and reducing stress concentration points. Therefore, safety performance and service life of the electrochemical apparatus 100 can be improved.

In an embodiment, the width $W_2$ of the second region 212 is 40%-95% of the width $W_1$ of the first region 211 (that is, $40\%\ W_1 \le W_2 \le 95\%\ W_1$). The inventor of this application has found that when the ratio of $W_2$ to $W_1$ is less than 40%, the width $W_2$ of the second region 212 is excessively small, which impacts the packaging strength, thereby impacting life of the package. On the contrary, when the ratio of $W_2$ to $W_1$ is greater than 95%, enough space is not available for accommodating the overflow adhesive, so that adhesive overflow is not desirably alleviated.

Figure 2:
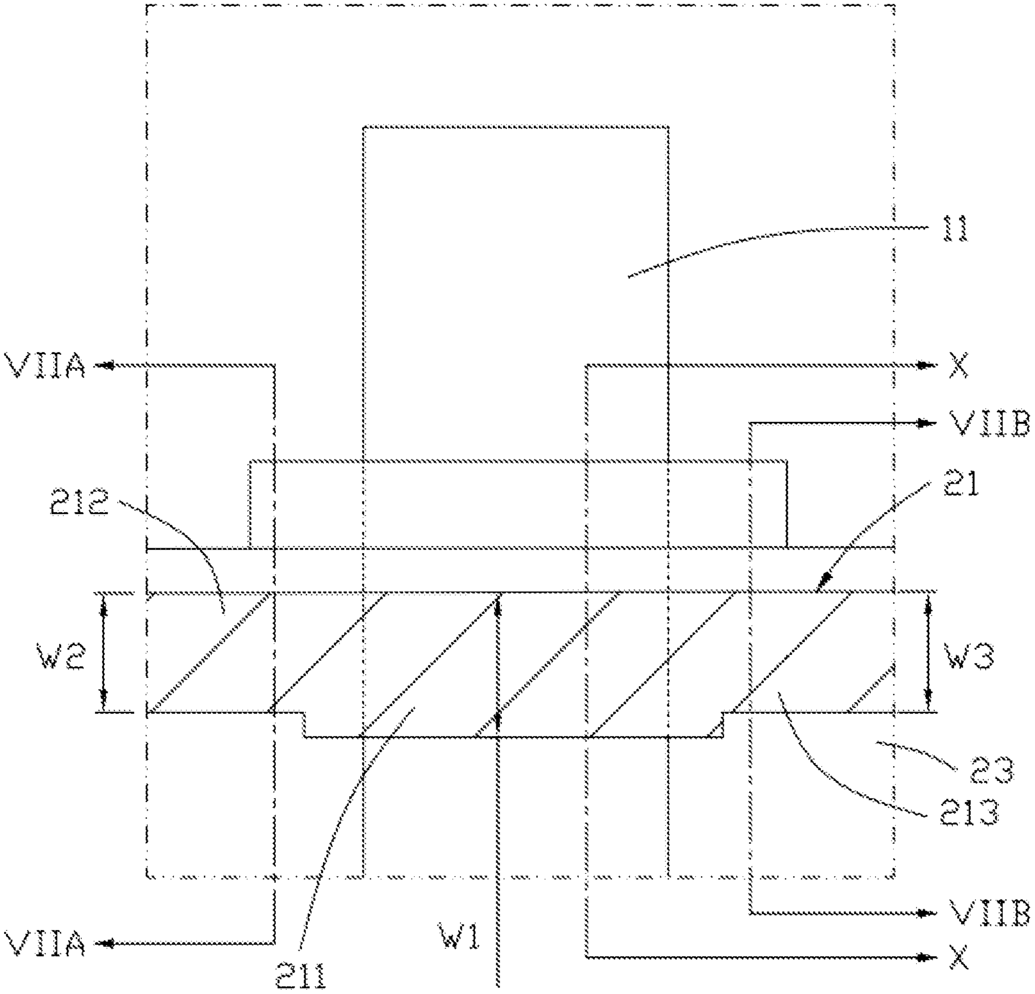
FIG. 2 is a local enlarged view of the electrochemical apparatus in FIG. 1 at position II in an embodiment.

In an embodiment, as shown in FIG. 1 and FIG. 2, the first sealing zone 21 further includes a third region 213, where the first region 211 connects the second region 212 and the third region 213. A width $W_3$ of the third region 213 is less than the width $W_1$ of the first region 211. The width $W_3$ is defined as a size of the third region 213 in the extension direction of the first sealing zone 21.

Figure 3:
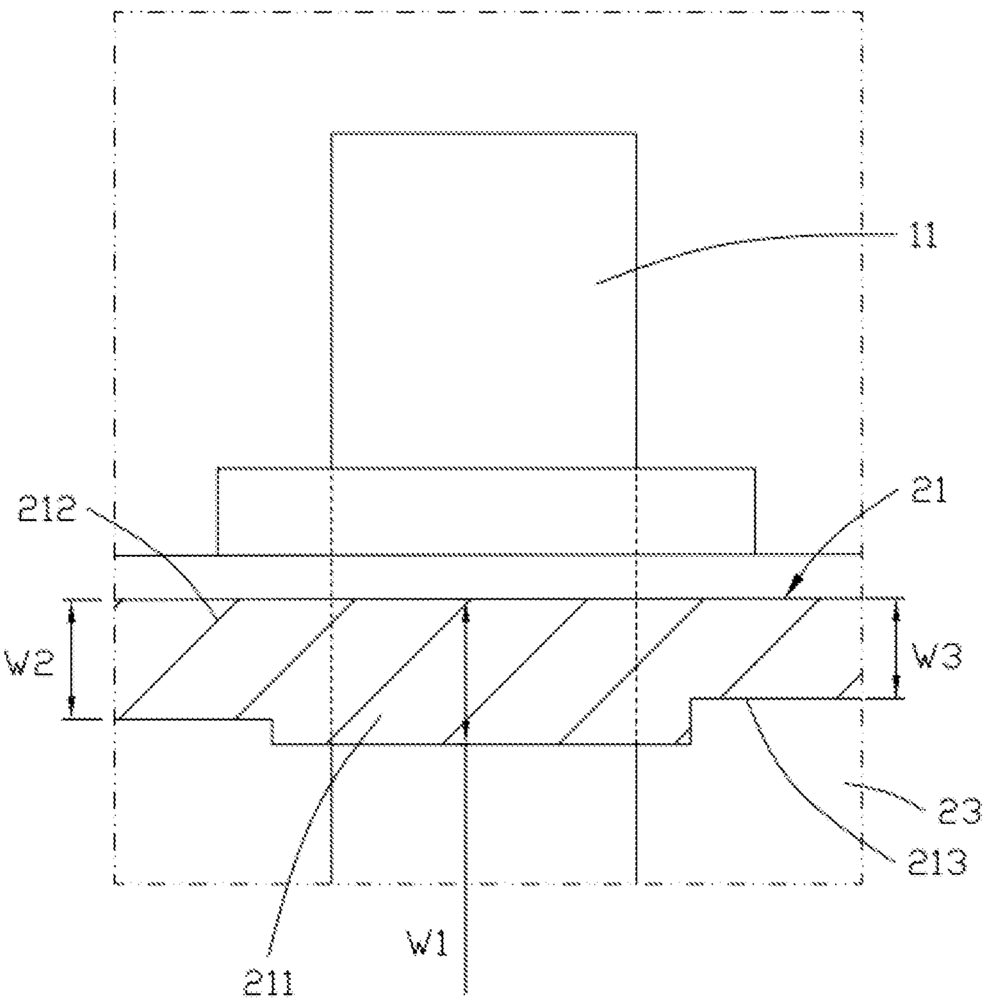
FIG. 3 is a local enlarged view of the electrochemical apparatus in FIG. 1 at position II in another embodiment.

As shown in FIG. 2, in an embodiment, the width of the second region 212 and the width of the third region 213 are both less than the width of the first region 211 and the width of the second region 212 is equal to that of the third region 213 (that is, $W_2=W_3<W_1$). In this case, space for accommodating overflow adhesive is formed on both sides of the first tab 11. As shown in FIG. 3, in another embodiment, the width of the second region 212 and the width of the third region 213 are both less than the width of the first region 211 and the width of the second region 212 is alternatively different from that of the third region 213. For example, the width of the second region 212 may be greater than that of the third region 213 (that is $W_3<W_2<W_1$).

Furthermore, the width $W_3$ of the third region 213 may also be 40%-95% of the width of the first region 211 (that is, $40\%\ W_1 \le W_3 \le 95\%\ W_1$). The inventor of this application has found that when the ratio of $W_3$ to $W_1$ is less 40%, the width of the third region 213 is excessively small, which impacts the packaging strength, thereby impacting life of the package. On the contrary, when the ratio of $W_3$ to $W_1$ is greater than 95%, enough space is not available for accommodating the overflow adhesive, so that adhesive overflow is not desirably alleviated.

Figure 4:
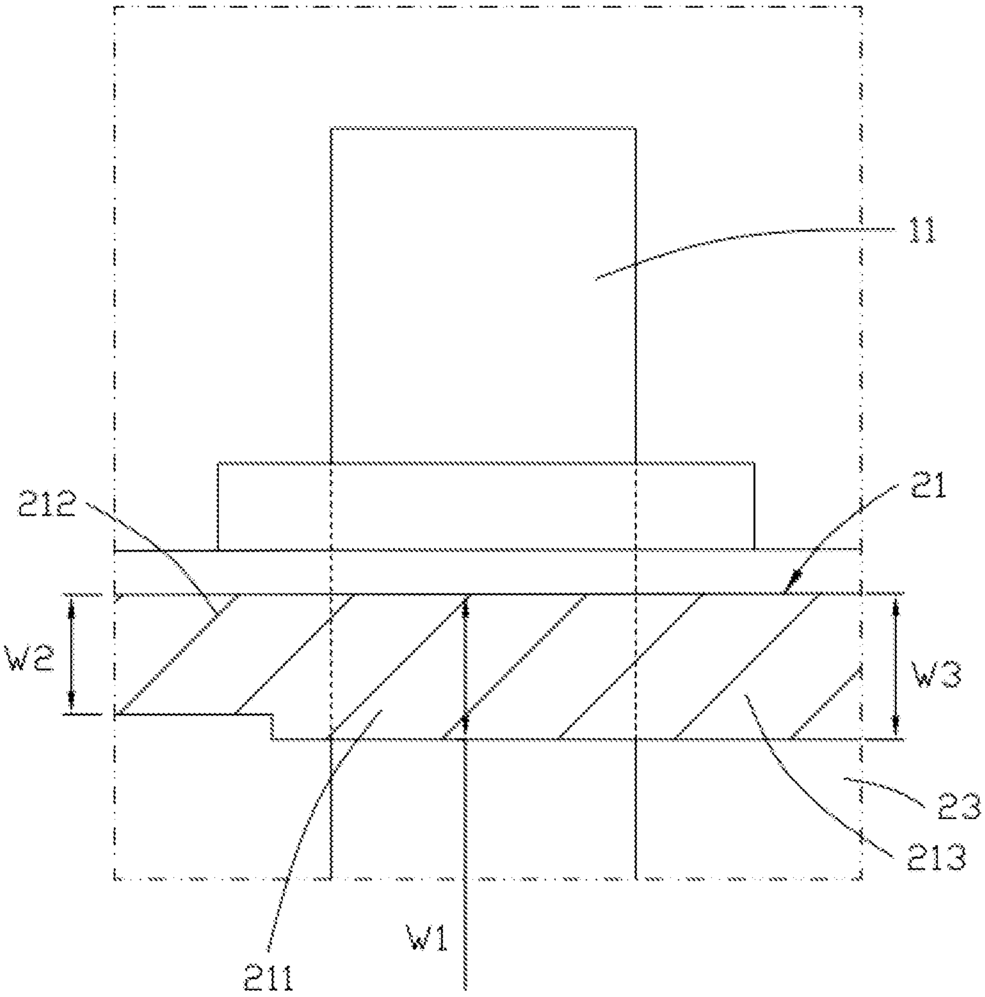
FIG. 4 is a local enlarged view of the electrochemical apparatus in FIG. 1 at position II in still another embodiment.

As shown in FIG. 4, in still another embodiment, the width of the third region 213 may further be equal to that of the first region 211 (that is, $W_2<W_1=W_3$). In this case, space for accommodating overflow adhesive is formed on only one side of the first tab 11.

Figure 5:
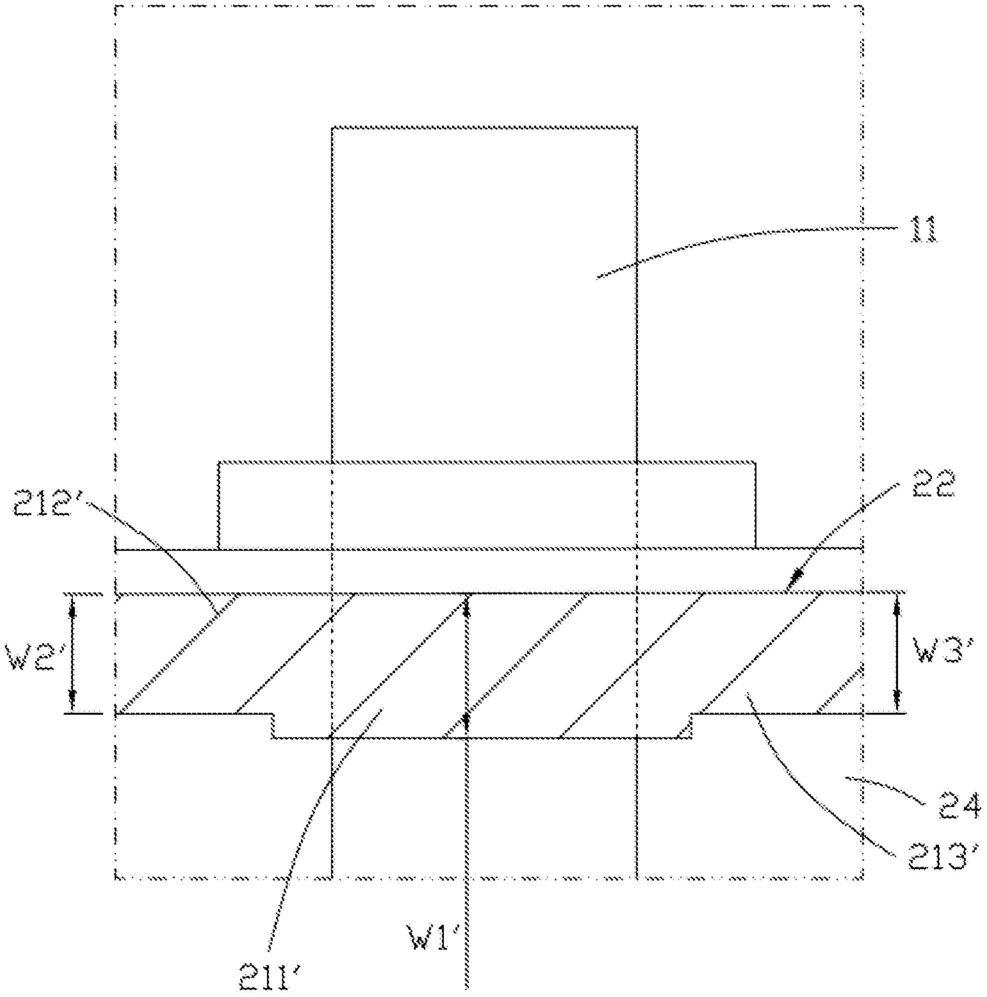
FIG. 5 is a local enlarged view of a second sealing zone of the electrochemical apparatus in FIG. 1 in an embodiment.

Referring to FIG. 1 and FIG. 5 together, in this embodiment, the shape of the second sealing zone 22 matches that of the first sealing zone 21. That is, the second sealing zone 22 includes a first region 211', a second region 212', and a third region 213', where the first region 211' covers a projection of the first tab 11 on the second sealing zone 22 and the first region 211' connects the second region 212' and the third region 213'. A width $W_2'$ of the second region 212' is less than the width $W_1'$ of the first region 211'. Furthermore, a width $W_3'$ of the third region 213' may also be less than the width $W_1'$ of the first region 211'.

Figure 6:
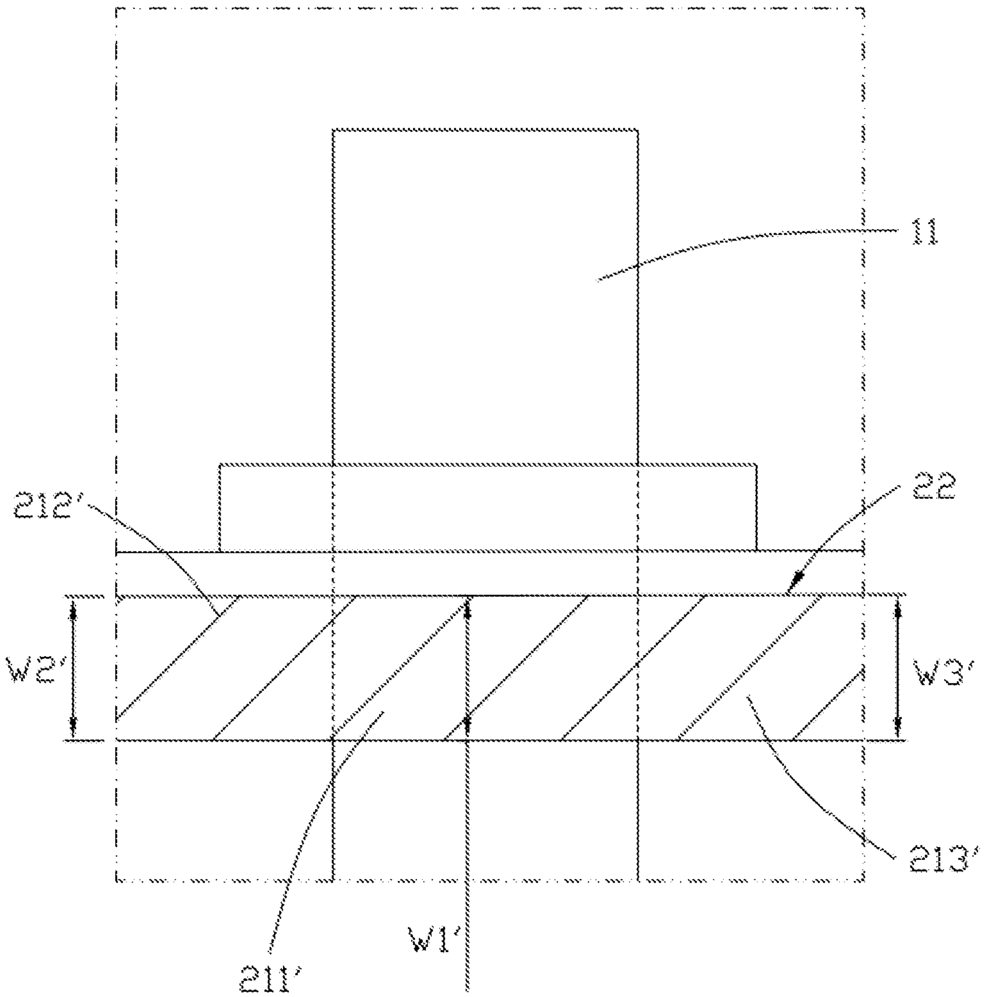
FIG. 6 is a local enlarged view of a second sealing zone of the electrochemical apparatus in FIG. 1 in another embodiment.

As shown in FIG. 6, in other embodiments, the second sealing zone 22 may alternatively have no width difference. That is, the first region 211', the second region 212', and the third region 213' all have the same width ($W_1'=W_2'=W_3'$).

Figure 7A:
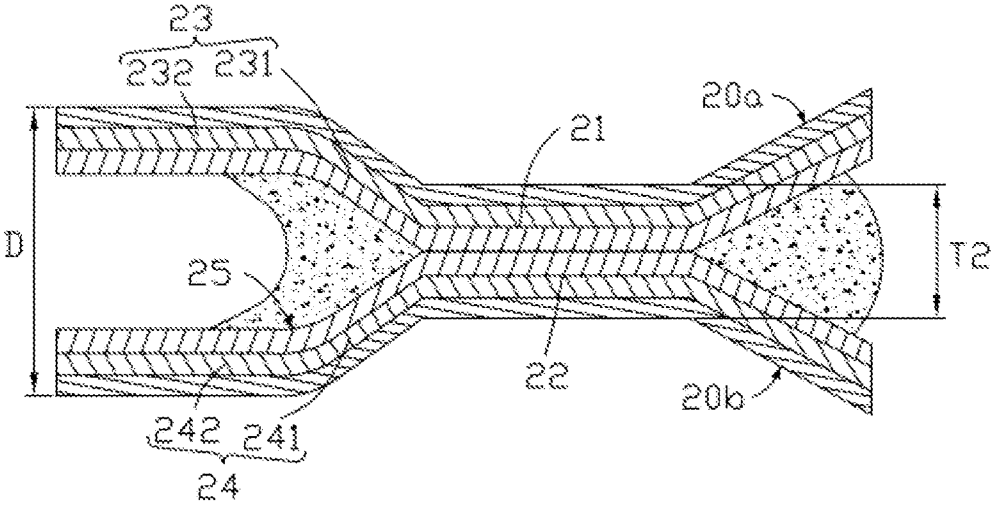
FIG. 7A is a schematic diagram of a cross section of the electrochemical apparatus shown in FIG. 2 along VIIA-VIIA.
Figure 7B:
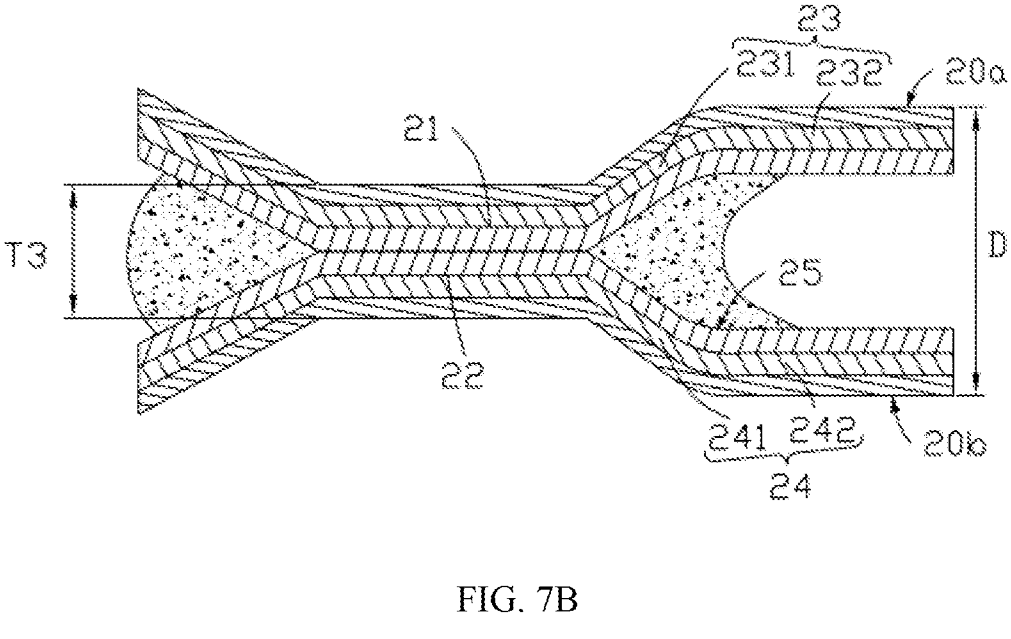
FIG. 7B is a schematic diagram of a cross section of the electrochemical apparatus shown in FIG. 2 along VIIB-VIIB in an embodiment.

As shown in FIG. 7A and FIG. 7B, in this embodiment, the first packaging film 20*a* further includes a first non-sealing zone 23. The first non-sealing zone 23 includes the first connecting portion 231 and the second connecting portion 232, where the first connecting portion 231 connects the first sealing zone 21 and the second connecting portion 232. In a thickness direction of the packaging film 20, an angle between the first connecting portion 231 and the first sealing zone 21 is greater than 0° and less than or equal to 90°, which means the first connecting portion 231 is not parallel to the first sealing zone 21. The thickness direction of the packaging film 20 is defined as a direction perpendicular to a plane where the first packaging film 20*a* or the second packaging film 20*b* is located.

In this way, an overflow adhesive groove 25 is formed between the first non-sealing zone 23 and the second packaging film 20*b*, where the overflow adhesive groove 25 can be used to accommodate the overflow adhesive. With the overflow adhesive groove 25 accommodating overflow adhesive, if the overflow adhesive exhibits a morphology protruding towards the electrode assembly 10, the packaging film 20 will have stress concentration points at the adhesive overflow locations. The overflow adhesive groove 25 of this application provides enough space for accommodating the overflow adhesive so that the overflow adhesive protrudes towards the first sealing zone 21 (this is, recessed towards the electrode assembly 10), preventing the packaging film 20 from having stress concentration points at the adhesive overflow locations.

Furthermore, the second packaging film 20*b* further includes a second non-sealing zone 24. The second non-sealing zone 24 includes a third connecting portion 241 and a fourth connecting portion 242, where the third connecting portion 241 connects the second sealing zone 22 and the fourth connecting portion 242. In the thickness direction of the packaging film 20, an angle between the third connecting portion 241 and the second sealing zone 22 is greater than 0° and less than or equal to 90°, which means the third connecting portion 241 is not parallel to the second sealing zone 22. In this way, the overflow adhesive groove 25 can have a greater space to accommodate more overflow adhesive.

Figure 8:
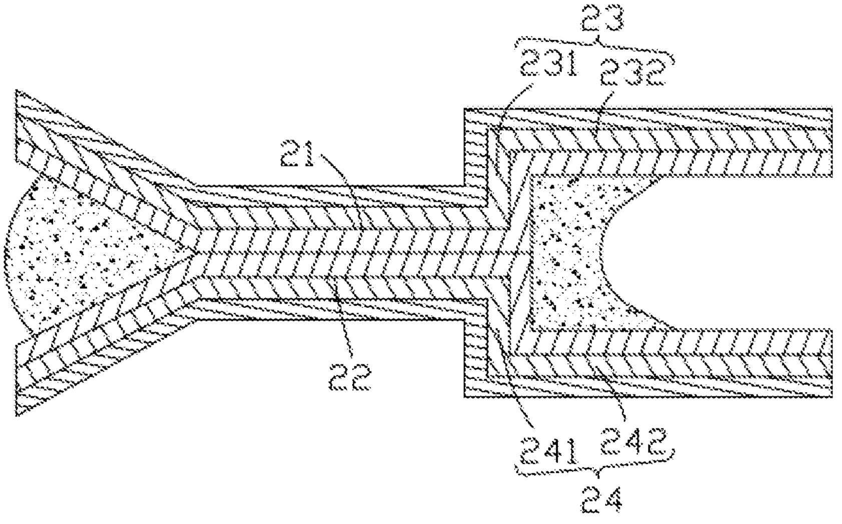
FIG. 8 is a schematic diagram of a cross section of the electrochemical apparatus shown in FIG. 2 along VIIB-VIIB in another embodiment.

As shown in FIG. 7A and FIG. 7B, the angle between the first connecting portion 231 and the first sealing zone 21 is less than 90 degrees and the angle between the third connecting portion 241 and the second sealing zone 22 is less than 90 degrees. In addition, the first connecting portion 231 and the third connecting portion 241 are both planar. In other embodiments, the angle between the first connecting portion 231 and the first sealing zone 21 and the angle between the third connecting portion 241 and the second sealing zone 22 may be changed based on actual needs. For example, as shown in FIG. 8, the angle between the first connecting portion 231 and the first sealing zone 21 may be equal to 90 degrees and the angle between the third connecting portion 241 and the second sealing zone 22 may be equal to 90 degrees. Certainly, the first connecting portion 231 and the third connecting portion 241 may alternatively be a curved surface, a stepped surface, or other shapes.

Figure 9:
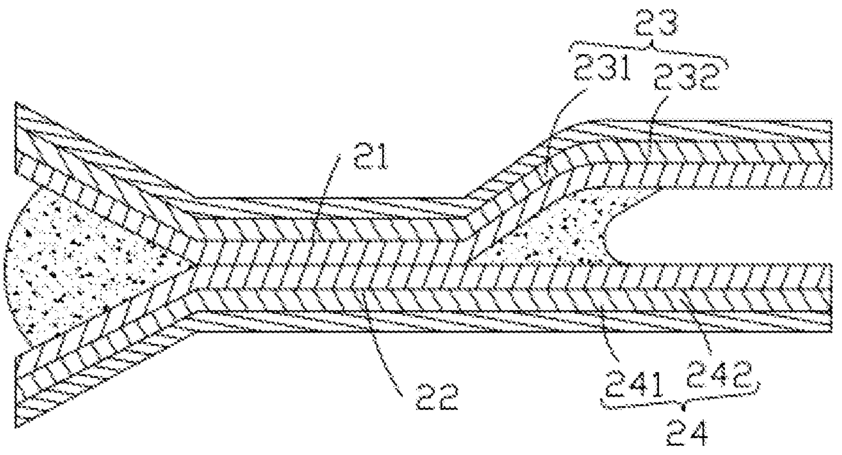
FIG. 9 is a schematic diagram of a cross section of the electrochemical apparatus shown in FIG. 2 along VIIB-VIIB in still another embodiment.

As shown in FIG. 9, in other embodiments, when the second sealing zone 22 has no width difference, the third connecting portion 241 and the fourth connecting portion 242 of the second non-sealing zone 24 are both located at the same plane as the second sealing zone 22.

As shown in FIG. 7A, in this embodiment, the second region 212 and the second sealing zone 22 together form a thickness $T_2$ (mm) and a distance between the second connecting portion 232 and the fourth connecting portion 242 is D (mm), where $T_2<D\leq 10T_2$. The inventor of this application has found that this range helps to guarantee the packaging strength and sealing effect of the second region 212 and the second sealing zone 22. The distance D being greater than $10T_2$ means an excessive amount of overflow adhesive, an over-sealed sealing zone, and over-fused polymer film in the packaging film 20. On the contrary, the distance D being less than or equal to $T_2$ means that the overflow adhesive at the sealing zone is not completely fused, in which case, the sealing is not firm.

As shown in FIG. 7B, further, the third region 213 and the second sealing zone 22 together form a thickness $T_3$ (mm), where $T_3<D\leq 10T_3$. The inventor of this application has found that this range can guarantee the packaging strength and sealing effect of the third region 213 and the second sealing zone 22. The distance D being greater than $10T_3$ means an excessive amount of overflow adhesive, an over-sealed sealing zone, and over-fused polymer film in the packaging film 20. On the contrary, the distance D being less than or equal to $T_3$ means that the overflow adhesive at the sealing zone is not completely fused, in which case, the sealing is not firm.

Figure 10:
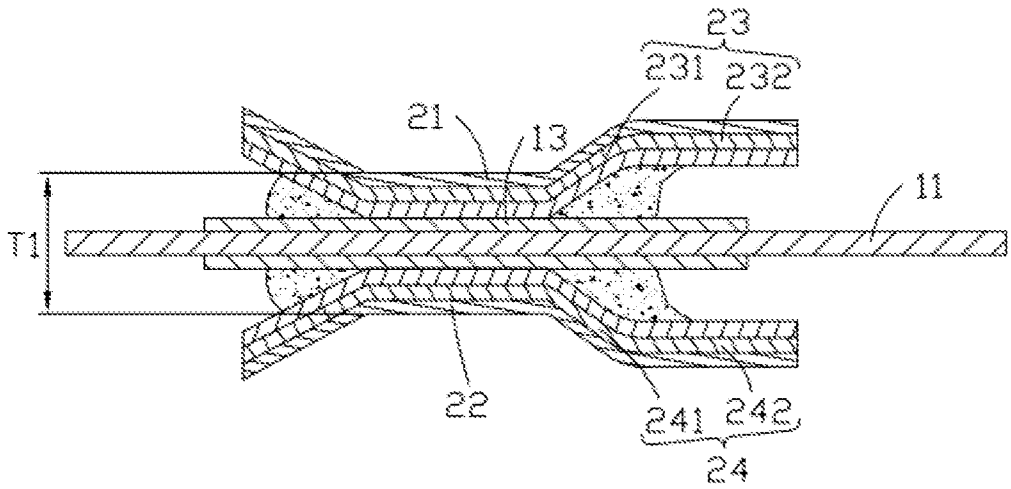
FIG. 10 is a schematic diagram of a cross section of the electrochemical apparatus shown in FIG. 2 along X-X.

As shown in FIG. 7A and FIG. 10, even further, the first region 211 and the second sealing zone 22 form a thickness $T_1$ (mm), where $T_2<T_1\leq 4T_2$. Therefore, the packaging strength at the first region 211 can be consistent with that at the second region 212, guaranteeing an overall packaging effect and avoiding local packaging weaknesses. The thickness $T_1$ formed by the first region 211 and the second sealing zone 22 should also include thickness of the first tab 11 and a tab sealant 13 on a surface of the first tab 11.

In this embodiment, a packaging tension between the first sealing zone 21 and the second sealing zone 22 is 1 N/mm-10 N/mm. The packaging tension may be used to characterize the packaging strength and effect. The packaging tension being less than 1 N/mm means inadequate packaging strength whereas 10 N/mm is the tension limit of conventional packaging films and the packaging tension being within 10 N/mm means the tension limit of the packaging film 20 is not exceeded.

As shown in FIG. 1, in this embodiment, the electrochemical apparatus 100 further includes a second tab 12, where the second tab 12 is electrically connected to the electrode assembly 10 and the second tab 12 is located on the same side of the electrode assembly 10 as the first tab 11. The first sealing zone 21 further includes a fourth region 214, where the fourth region 214 covers a projection of the second tab 12 on the first sealing zone 21 and the second region 212 connects to the fourth region 214. The fourth region 214 and the first region 211 share the same width. A width of the fourth region 214 is defined as $W_4$, where $W_4=W_1$.

Figure 11:
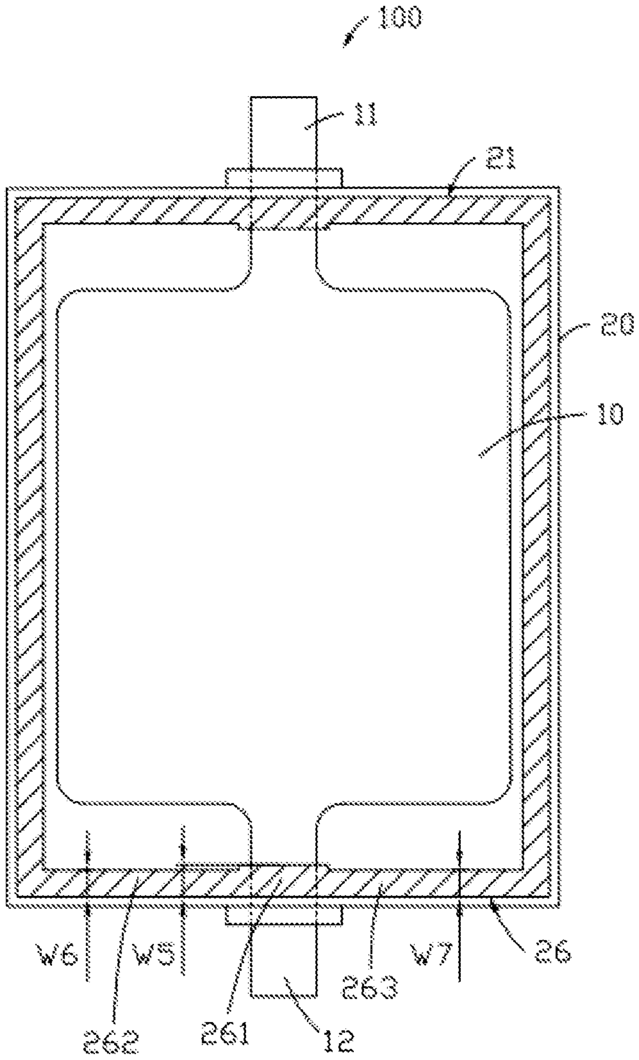
FIG. 11 is a schematic diagram of a cross section of an electrochemical apparatus according to another embodiment of this application.

As shown in FIG. 11, in another embodiment, the second tab 12 is located on a different side of the electrode assembly 10 than the first tab 11. For example, the first tab 11 and the second tab 12 are respectively located on two opposite sides of the electrode assembly 10. The first packaging film 20*a* further includes a third sealing zone 26, where the third sealing zone 26 includes a fifth region 261, a sixth region 262, and a seventh region 263, the fifth region 261 covers a projection of the second tab 12 on the third sealing zone 26, and the fifth region 261 connects between the sixth region 262 and the seventh region 263. A width of the sixth region 262 is less than that of the fifth region 261.

Furthermore, a width of the seventh region 263 may also be less than that of the fifth region 261. The width of the fifth region 261 is defined as $W_5$, that of the sixth region 262 as $W_6$, and that of the seventh region 263 as $W_7$, where at least one of $W_6$ and $W_7$ is less than $W_5$.

Figure 12:
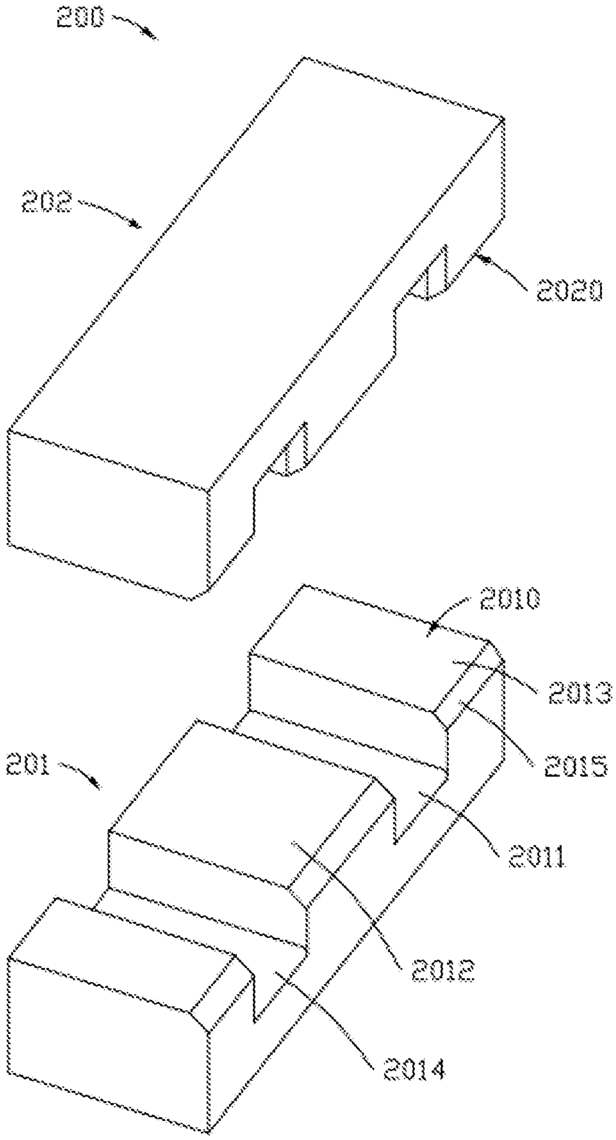
FIG. 12 is a schematic structural diagram of a packaging seal head for sealing an electrochemical apparatus according to an embodiment of this application.

As shown in FIG. 12, a packaging seal head 200 for sealing the electrochemical apparatus 100 according to an embodiment of this application is provided. The packaging seal head 200 includes a first seal head 201 and a second seal head 202 corresponding to the first seal head 201. The first seal head 201 includes a first end face 2010 facing the second seal head 202 and the second seal head 202 includes a second end face 2020 facing the first seal head 201.

At least one of the first end face 2010 and the second end face 2020 includes a first end face area 2011 corresponding to the first region 211, a second end face area 2012 corresponding to the second region 212, and a third end face area 2013 corresponding to the third region 213, where the first end face area 2011 is recessed with respect to the second end face area 2012 and the third end face area 2013 (which means a slot is formed). A chamfered face 2015 is included at an edge of the second end face area 2012 facing the electrode assembly 10.

Furthermore, a chamfered face 2015 may also be included in at an edge of the third end face area 2013 facing the electrode assembly 10

According to this application, with the second end face area 2012 provided with the chamfered face 2015, after the packaging seal head 200 is applied to seal the electrochemical apparatus 100, the chamfered face 2015 enables the second region 212 of the first sealing zone 21 to have a width difference with respect to the first region 211, so that a space for accommodating the overflow adhesive is formed.

It can be understood that the shape of the chamfered face 2015 determines an included angle between the first connecting portion 231 and the second connecting portion 232, an included angle between the third connecting portion 241 and the fourth connecting portion 242, shapes of the first connecting portion 231 and the third connecting portion 241, and the like. For example, with the chamfered face 2015 of the second end face area 2012 being an inclined plane, the first connecting portion 231 is also planar. With the chamfered face 2015 of the second end face area 2012 being a curved surface, the first connecting portion 231 is also a curved surface. Certainly, in other embodiments, the chamfered face 2015 may alternatively be in a stepped shape or in other shapes.

As shown in FIG. 12, in this embodiment, the first end face 2010 matches the second end face 2020. The first end face 2010 and the second end face 2020 both include a first end face area 2011, a second end face area 2012, and a third end face area 2013. The second end face area 2012 and the third end face area 2013 of the first end face 2010 both include a chamfered face 2015 and the second end face area 2012 of the second end face 2020 includes a chamfered face 2015.

Furthermore, the third end face area 2013 also includes a chamfered face 2015. After the packaging seal head 200 is applied to seal the electrochemical apparatus 100, both the width of the second region 212 and that of the third region 213 are less than that of the first region 211.

More specifically, the first end face 2010 and the second end face 2020 further both include a fourth end face area 2014 corresponding to the fourth region 214. The fourth end face area 2014 is also recessed with respect to the second end face area 2012 and the third end face area 2013. That is, the first end face 2010 and the second end face 2020 both include two slots, where two slots respectively correspond to the first tab 11 and the second tab 12 of the electrochemical apparatus 100. In this case, the packaging seal head 200 can be used to seal an electrochemical apparatus 100 with the first tab 11 and the second tab 12 located on the same side of the electrode assembly 10. The chamfered faces 2015 of the second end face area 2012 and the third end face area 2013 of the first end face 2010 have equal sizes. Correspondingly, in the electrochemical apparatus 100, the width of the second region 212 is equal to that of the third region 213 (that is, $W_2=W_3$).

Figure 13:
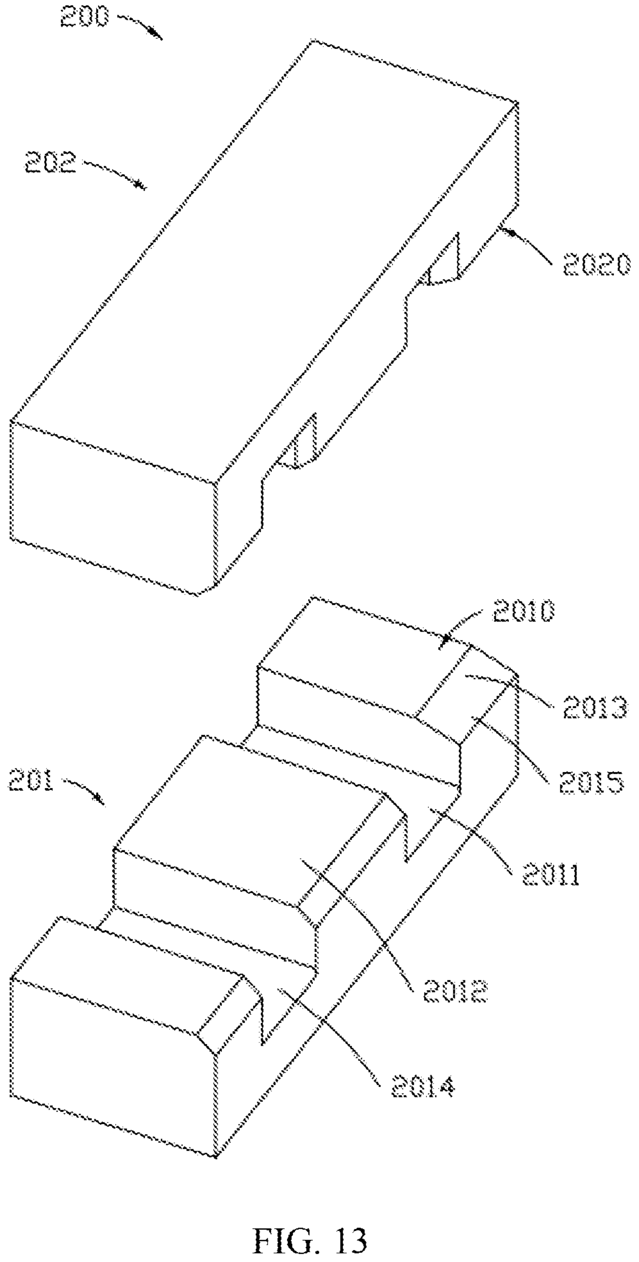
FIG. 13 is a schematic structural diagram of a packaging seal head for sealing an electrochemical apparatus according to another embodiment of this application.

As shown in FIG. 13, in another embodiment, the chamfered faces 2015 of the second end face area 2012 and the third end face area 2013 of the first end face 2010 have different sizes. Correspondingly, in the electrochemical apparatus 100, the width of the second region 212 is different from that of the third region 213. For example, the width of the second region 212 is greater than that of the third region 213 (that is, $W_3<W_2$).

Figure 14:
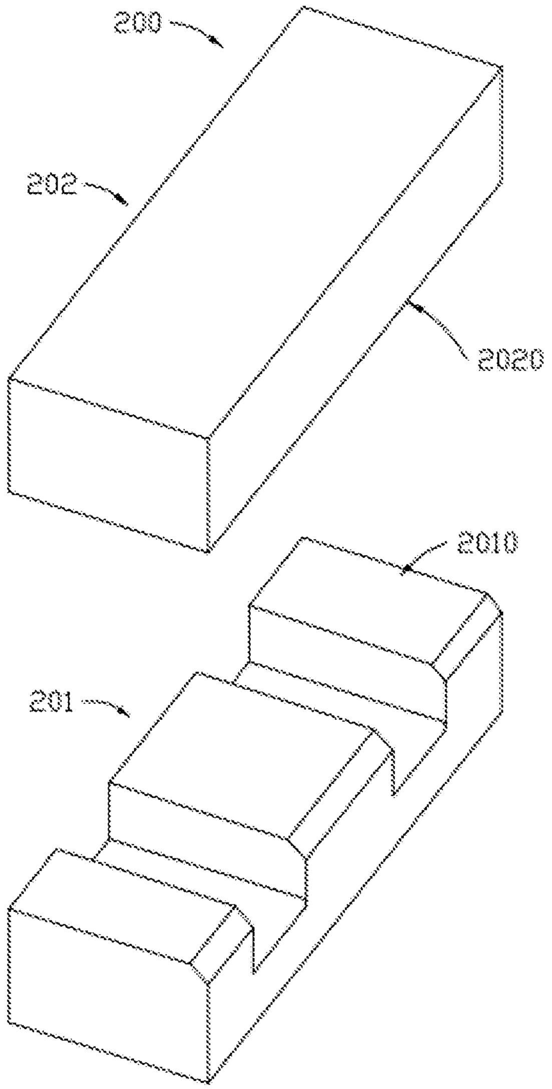
FIG. 14 is a schematic structural diagram of a packaging seal head for sealing an electrochemical apparatus according to still another embodiment of this application.

As shown in FIG. 14, in still another embodiment, the first end face 2010 may not match the second end face 2020. For example, the first end face 2010 is not provided with a slot and is not provided with the first end face are 2011, the second end face area 2012, or the third end face area 2013. Correspondingly, in the electrochemical apparatus 100, the second sealing zone 22 does not have a width difference.

Figure 15:
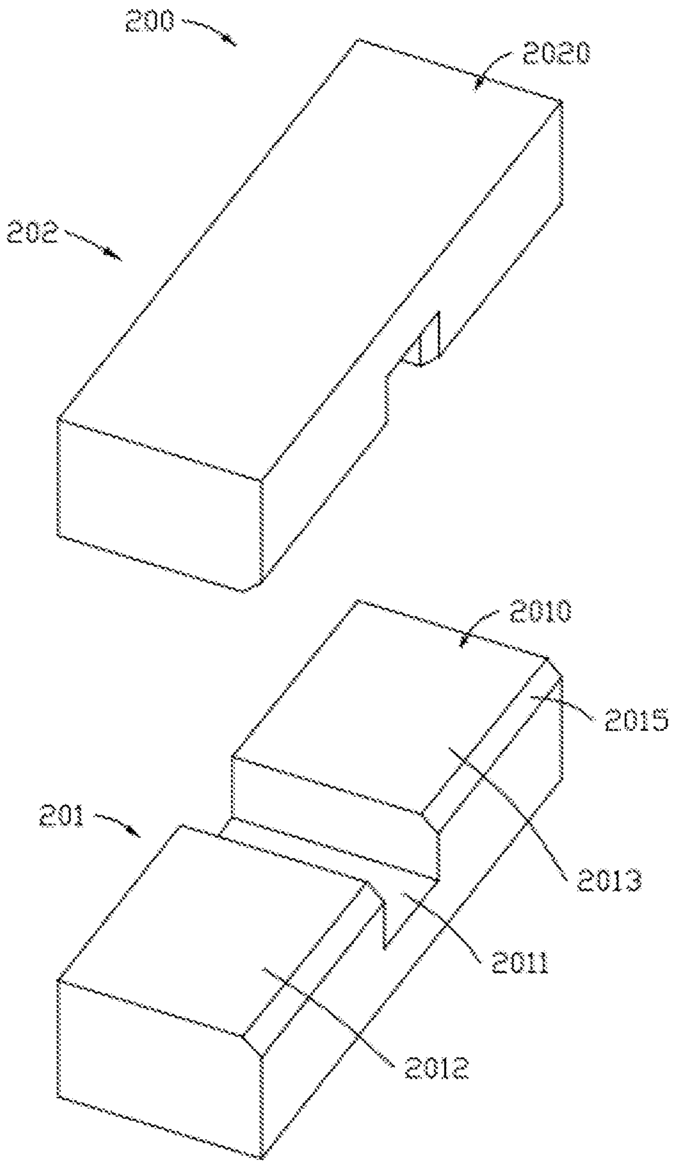
FIG. 15 is a schematic structural diagram of a packaging seal head for sealing an electrochemical apparatus according to yet still another embodiment of this application.

As shown in FIG. 15, in yet still another embodiment, the first end face 2010 and the second end face 2020 both include only one slot. Correspondingly, the packaging seal head 200 can be used to seal an electrochemical apparatus 100 with the first tab 11 and the second tab 12 located on different sides of the electrode assembly 10.

Figure 16:
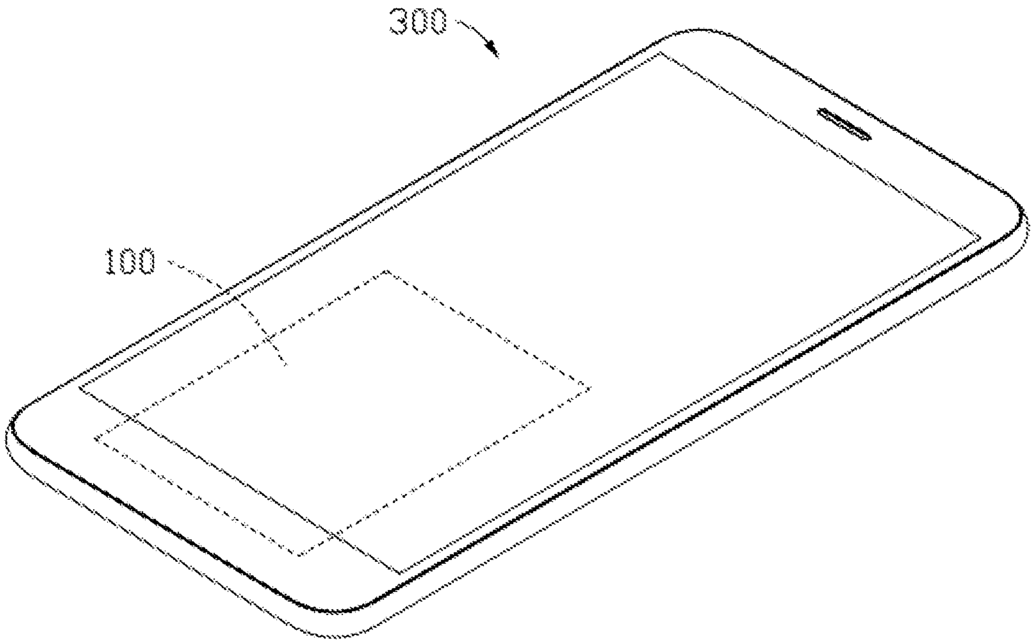
FIG. 16 is a schematic structural diagram of an electronic apparatus according to an embodiment of this application.

An embodiment of this application further provides an electronic apparatus 300, where the electronic apparatus 300 includes an electrochemical apparatus 100. The electronic apparatus 300 may be a consumer electronic product (such as a mobile communications apparatus, a tablet computer, or a laptop computer), an electric tool, an unmanned aerial vehicle, an energy storage apparatus, a traction apparatus, or the like. Referring to FIG. 16, in an embodiment, the electronic apparatus 300 is a mobile communications apparatus.

In conclusion, it should be noted that the foregoing embodiments are merely intended to describe the technical solutions of this application, but not intended to constitute any limitation. Although this application is described in detail with reference to preferred embodiments, persons of ordinary skill in the art should understand that modifications or equivalent replacements can be made to the technical solutions of this application without departing from the spirit and scope of the technical solutions of this application.

What is claimed is:

1. An electrochemical apparatus, comprising: an electrode assembly, a packaging film and a first tab, wherein the first tab is electrically connected to the electrode assembly, the packaging film comprises a first packaging film and a second packaging film located at two sides of the first tab respectively, the first packaging film comprises a first sealing zone, the second packaging film comprises a second sealing zone, and the first sealing zone and the second sealing zone are bonded to seal the electrode assembly; wherein the first sealing zone comprises a first region and a second region, the first region covers a projection of the first tab on the first sealing zone, the second region connects to the first region, and a width of the second region is less than a width of the first region;

the width of the second region is 40%-95% of the width of the first region;

the first packaging film further comprises a first non-sealing zone, the first non-sealing zone comprises a first connecting portion and a second connecting portion, wherein the first connecting portion connects the first sealing zone and the second connecting portion;

the second packaging film further comprises a second non-sealing zone, the second non-sealing zone comprises a third connecting portion and a fourth connecting portion, wherein the third connecting portion connects the second sealing zone and the fourth connecting portion; and the second region and the second sealing zone together form a thickness $T_2$ (mm) and a distance between the second connecting portion and the fourth connecting portion is D (mm), wherein $T_2<D\leq 10T_2$; and an overflow adhesive groove is formed between the first non-sealing zone and the second packaging film, the overflow adhesive groove being configured to accommodate overflow adhesive such that the overflow adhesive protrudes toward the first sealing zone and is recessed toward the electrode assembly.

2. The electrochemical apparatus according to claim 1, wherein in a thickness direction of the packaging film, an angle between the first connecting portion and the first sealing zone is greater than 0° and less than or equal to 90°.

3. The electrochemical apparatus according to claim 2, wherein in the thickness direction of the packaging film, an angle between the third connecting portion and the second sealing zone is greater than 0° and less than or equal to 90°.

4. The electrochemical apparatus according to claim 1, wherein the first region and the second sealing zone form a thickness $T_1$ (mm), wherein $T_2<T_1\leq 4T_2$.

5. The electrochemical apparatus according to claim 1, wherein a packaging tension between the first sealing zone and the second sealing zone is 1 N/mm-10 N/mm.

6. The electrochemical apparatus according to claim 1, wherein the first sealing zone further comprises a third region, the third region connects to the first region, and a width of the third region is less than the width of the first region.

7. The electrochemical apparatus according to claim 6, wherein the width of the third region is 40%-95% of the width of the first region.

8. The electrochemical apparatus according to claim 1, further comprising a second tab, wherein the second tab is electrically connected to the electrode assembly, the second tab is located on the same side of the electrode assembly as the first tab; and the first sealing zone further comprises a fourth region, wherein the fourth region covers a projection of the second tab on the first sealing zone, the second region connects to the fourth region, and the width of the second region is less than a width of the fourth region.

9. The electrochemical apparatus according to claim 1, further comprising a second tab, wherein the second tab is electrically connected to the electrode assembly, the second tab is located on a different side of the electrode assembly than the first tab; and the first packaging film further comprises a third sealing zone, wherein the third sealing zone comprises a fifth region and a sixth region, the fifth region covers a projection of the second tab on the third sealing zone, the fifth region connects to the sixth region, and a width of the sixth region is less than a width of the fifth region.

10. An electronic apparatus, comprising an electrochemical apparatus, the electrochemical apparatus comprising an electrode assembly, a packaging film and a first tab, wherein the first tab is electrically connected to the electrode assembly, the packaging film comprises a first packaging film and a second packaging film located at two sides of the first tab respectively, the first packaging film comprises a first sealing zone, the second packaging film comprises a second sealing zone, and the first sealing zone and the second sealing zone are bonded to seal the electrode assembly; wherein the first sealing zone comprises a first region and a second region, the first region covers a projection of the first tab on the first sealing zone, the second region connects to the first region, and a width of the second region is less than a width of the first region;

the width of the second region is 40%-95% of the width of the first region;

the first packaging film further comprises a first non-sealing zone, the first non-sealing zone comprises a first connecting portion and a second connecting portion, wherein the first connecting portion connects the first sealing zone and the second connecting portion;

the second packaging film further comprises a second non-sealing zone, the second non-sealing zone comprises a third connecting portion and a fourth connecting portion, wherein the third connecting portion connects the second sealing zone and the fourth connecting portion; and the second region and the second sealing zone together form a thickness $T_2$ (mm) and a distance between the second connecting portion and the fourth connecting portion is D (mm), wherein $T_2<D\leq 10T_2$; and an overflow adhesive groove is formed between the first non-sealing zone and the second packaging film, the overflow adhesive groove being configured to accommodate overflow adhesive such that the overflow adhesive protrudes toward the first sealing zone and is recessed toward the electrode assembly.

11. The electronic apparatus according to claim 10, wherein in a thickness direction of the packaging film, an angle between the first connecting portion and the first sealing zone is greater than 0° and less than or equal to 90°.

12. The electronic apparatus according to claim 11, wherein in the thickness direction of the packaging film, an angle between the third connecting portion and the second sealing zone is greater than 0° and less than or equal to 90°.

13. The electronic apparatus according to claim 10, wherein the first region and the second sealing zone form a thickness $T_1$ (mm), wherein $T_2<T_1\leq 4T_2$.

14. The electronic apparatus according to claim 10, wherein a packaging tension between the first sealing zone and the second sealing zone is 1 N/mm-10 N/mm.

15. The electronic apparatus according to claim 10, wherein the electrochemical apparatus further comprises a second tab, wherein the second tab is electrically connected to the electrode assembly, the second tab is located on the same side of the electrode assembly as the first tab; and the first sealing zone further comprises a fourth region, wherein the fourth region covers a projection of the second tab on the first sealing zone, the second region connects to the fourth region, and the width of the second region is less than a width of the fourth region.

16. The electronic apparatus according to claim 10, wherein the electronic apparatus further comprises a second tab, wherein the second tab is electrically connected to the electrode assembly, the second tab is located on a different side of the electrode assembly than the first tab; and the first packaging film further comprises a third sealing zone, wherein the third sealing zone comprises a fifth region and a sixth region, the fifth region covers a projection of the second tab on the third sealing zone, the fifth region connects to the sixth region, and a width of the sixth region is less than a width of the fifth region.

* * * * *